Figure 4:
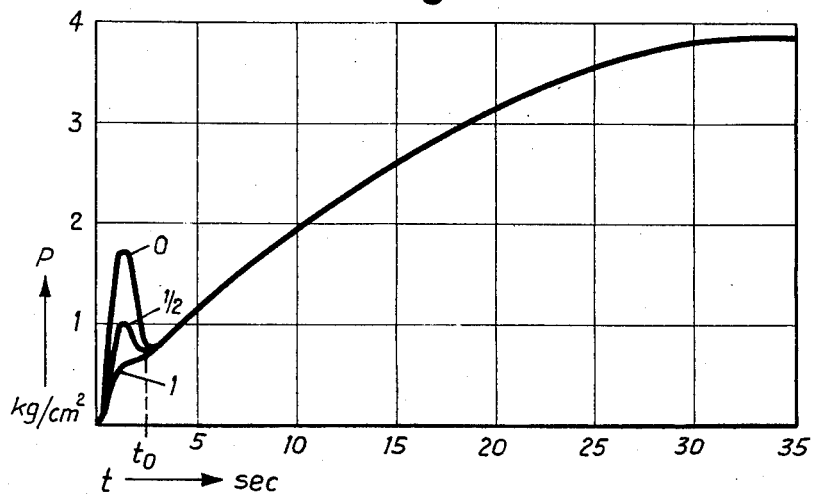

Feb. 5, 1957  S. KELLER  2,780,499
FLUID PRESSURE BRAKE
Filed May 16, 1952  2 Sheets-Sheet 1
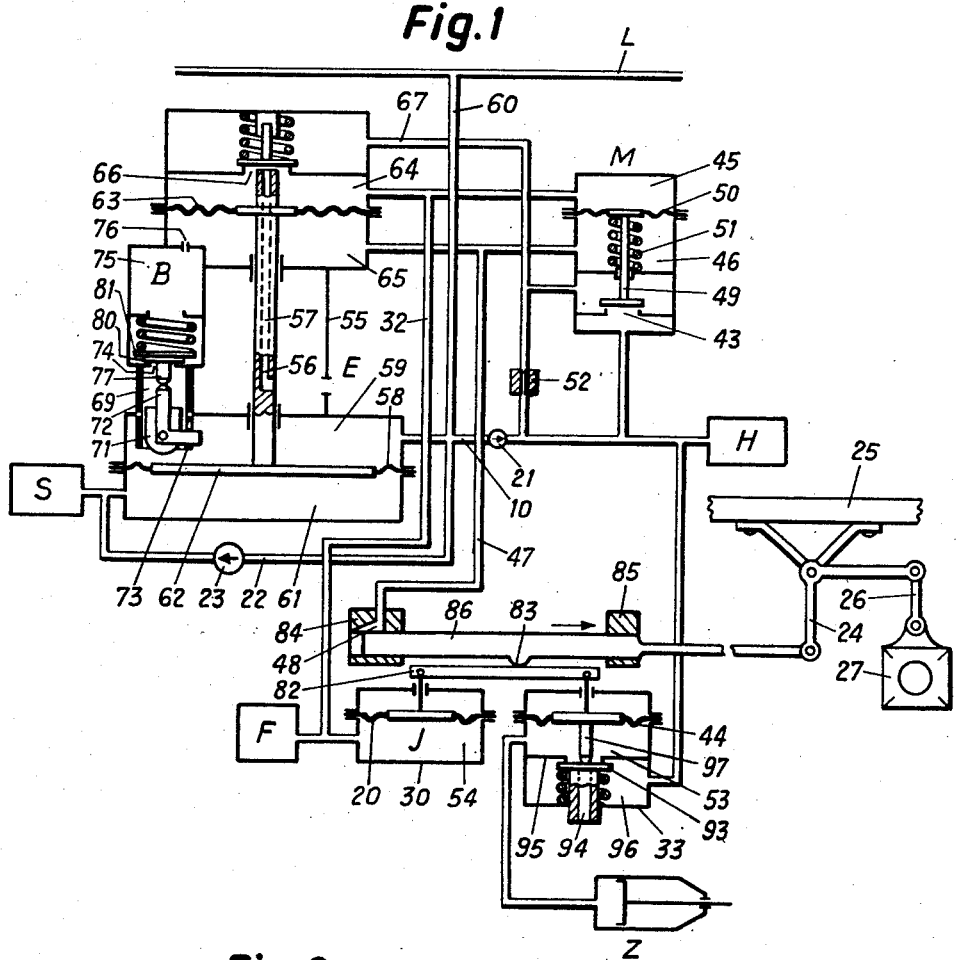
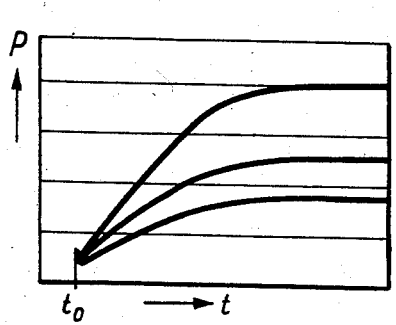
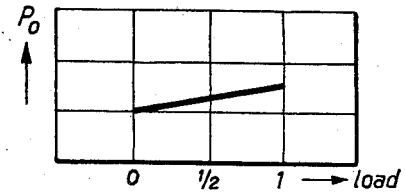
INVENTOR: S. Keller Feb. 5, 1957 S. KELLER 2,780,499
FLUID PRESSURE BRAKE
Filed May 16, 1952 2 Sheets-Sheet 2

INVENTOR:
S. Keller

United States Patent Office 2,780,499
Patented Feb. 5, 1957

2,780,499

FLUID PRESSURE BRAKE

Siegfried Keller, Effretikon, Switzerland, assignor to Machine Tool Works Oerlikon, Administration Company, Zurich-Oerlikon, Switzerland, a Swiss company Application May 16, 1952, Serial No. 288,359

5 Claims. (Cl. 303—22)

The present invention relates to fluid pressure brakes for vehicles, and more particularly to a type of brake in which the pressure in a brake cylinder is controlled by an operating condition of the vehicle, such as the loading thereof.

The invention further relates in particular to such fluid pressure brakes in which the brake cylinder is fed through a relay valve device which is controlled by a triple valve device on the one hand and by the said operating condition of the vehicle on the other.

An object of the invention consists in the disposition of effective means for influencing the rapid pressure rise in the brake cylinder at the commencement of a braking operation. This rise of pressure should take place at approximately the same speed, independently of the loading of the vehicle. The duration of this rapid increase of pressure in the brake cylinder should, however, be dependent on the loading of the vehicle in such a way that the pressure prevailing in the brake cylinder at the end of the rapid pressure rise increases with increasing loading of the vehicle, whilst when the vehicle is empty the said pressure does not fall below a definite minimum value.

This manner of functioning of the fluid pressure brake is achieved by the use of a special triple valve through which a control chamber of the relay valve device is connected to the auxiliary air reservoir, the triple valve being provided with a control chamber in which a pressure coinciding with the pressure in the relay valve device prevails and tends to close the triple valve, and this valve being further provided with a supplementary control chamber the pressure of which counteracts the pressure in the aforementioned control chamber. In this supplementary control chamber, which communicates with the exterior atmosphere through a throttling passage whose cross-sectional area of passage depends on the loading of the vehicle, a pressure surge is produced at the beginning of a braking operation by means of the compressed air tapped from the brake pipe. This pressure surge acts on the triple valve and keeps the latter open for a longer time, and wider, than would have been the case in the absence of the supplementary control chamber. The aforementioned throttling passage is so controlled by the relay valve device that the pressure surge escapes to the exterior atmosphere more slowly when the vehicle is empty than when the vehicle is loaded. In this way the action of the relay valve device, as a result of which action for a given increase of pressure in the control chamber of the said relay valve device the pressure in the brake cylinder rises more slowly with the vehicle empty than with the vehicle loaded, is compensated.

The pressure surge takes effect not only in the supplementary control chamber of the triple valve, but also in a supplementary control chamber of an auxiliary valve which, on the attainment of a predetermined pressure in the control chamber of the relay valve device, interrupts the initial rapid charging of this chamber and institutes a slower charging thereof. The said supplementary valve is kept open longer when the vehicle is empty than when the vehicle is loaded, whereby the rapid rise of pressure is caused to continue longer than when the vehicle is loaded, with the result that the necessary pressure for applying the brake-blocks is obtained with certainty even when the vehicle is empty.

Figure 5:
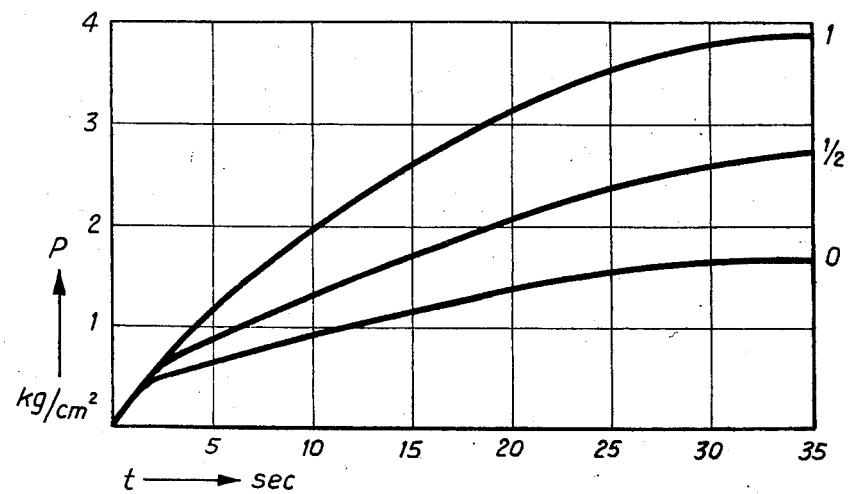

In the drawing Figure 1 is a diagram showing an embodiment of the invention schematically. Figures 2 and 3 are pressure curves. Figures 4 and 5 are further pressure curves showing the relation of pressures between the brake cylinder 2 and chamber 54. The curves further illustrate these relationships for zero, one half and full load as indicated. Slidingly mounted in a housing 55 is a valve stem 57 provided over part of its length with a bore 56. The lower end of said valve stem projects into a portion of the housing divided by a membrane 58 into two chambers 59, 61, and is secured to a plate 62 connected to the membrane 58. The chamber 59 communicates by the pipe 60 with the main air pipe L, and the chamber 61 communicates with the constant pressure air tank S. The upper end of the stem 57 projects into a section of the housing which is likewise, by a membrane 63, divided into two chambers 64 and 65, and is rigidly attached to the said membrane. The chamber 64 has an inlet controlled by a spring-loaded valve 66 and communicating through the pipe 67 with the auxiliary air reservoir H, and also communicates with an expansion chamber F through a pipe 32.

The quick service valve device B assembled with the triple valve E is provided in its lower portion with a chamber 69 designed as a cylindrical guide and connected to the chamber 59. In the chamber 69 a member 71, on which a right-angled bell-crank 72 is pivotally mounted, is so disposed as to be slidable parallel to the centreline of the stem 57, and normally bears on the plate 62. That arm of the bell-crank 72 which stands at right angles to the centreline of the stem projects through a slot 73 in the said guide into the chamber 59, in such a way that on an upward movement of the member 71 the said arm of the bell-crank encounters the top of the chamber 59 and thereupon swivels on its fulcrum on the member 71. The chamber 69 opens through a flow-valve generally designated by the numeral 74 into a larger transmission chamber 75, which has an outlet to the chamber 65 through a throttling passage 76. The spring-loaded valve-body 80 is provided with a stem 77 which, in the position of rest of the quick service valve device as shown in the drawing, rests on that arm of the bell-crank 72 which is parallel to it. Rigidly connected to the valve-body 80 is a piston 81 extending to within a short distance from the side of the casing, which piston, when the valve 74 is open, enables compressed air to flow away into the chamber 75 and keeps the valve open so long as the flow continues.

The valve device M has two control chambers, 45 and 46, separated from one another by the membrane 50, the control chamber 45 communicating with the chamber 64 of the triple valve E. The chamber 46, on the other hand, communicates with the chamber 65 of the triple valve E and also, via the pipe 47 and the variable throttling passage 48, with the exterior atmosphere. The body of the valve 43 is connected by means of the stem 49 to the membrane 50 and is normally lifted from its seat by the spring 51. The throttling passage 52 is arranged parallel to the valve 43.

A relay valve device J is provided with two casings 30 and 33 in each of which a membrane, 20 and 44 respectively, is accommodated, the said membranes respectively closing off the pressure chambers 54 and 53 and being mechanically connected to the ends of the rocker beam 82. The latter bears against a rounded boss 83 of a bar 86 slidably mounted in the mounting brackets 84 and 85. This rod is pivoted upon an angular lever 24 which is rotatably mounted upon the car body 25 which is connected through a guide 26 with a bearing shield 27 of the car axle. The car body 25 is supported in the usual manner upon wheel axles by springs not shown in the drawing. When the load of the car is increased, the car body 25 is lowered in relation to the member 27 so that the rod 85 is shifted in the direction of the arrow. The left-hand end of the bar 86 progressively increases the cross-sectional area of passage of the throttling aperture 48 as the bar slides in the direction of the arrow. Whilst the membrane 20 serves to force the left end of the rocker beam 82 upwards under the influence of the pressure in the pressure chamber 54 connected to the expansion tank F, the membrane 44 serves to control a double valve 93. The spring-loaded valve body 94, provided with a bore leading to the exterior atmosphere, is normally pressed against a seating formed by the partition wall 95 closing off the chamber 53. In this position of the valve, therefore, the chamber 96 communicating with the auxiliary air reservoir H is closed off from the chamber 53 communicating with the brake cylinder Z, whilst the chamber 53 communicates with the exterior atmosphere through the bore in the valve body 94. If the right-hand end of the rocker beam 82 is pressed down, a stem 97 secured to the membrane 44 comes to bear upon the valve body 94, first closing the bore in said body and then, according as the membrane 44 is further displaced, lifting the valve body from its seating and thereby placing the chambers 53 and 96 in communication. A conduit 10 branches off from the conduit 60 through the check valve 21 to the auxiliary air container H and another conduit 22 through a check valve 23 to the steering air container S.

The following is the manner in which the arrangement functions:

On the occurrence of a reduction of pressure in the main air pipe L, the plate 62 is moved upwards under the influence of the constant pressure air tank S, and takes with it the stem 57 and the valve-body 71. The vertical arm of the bell-crank 72 is thereby caused to press against the stem 77, and opens the valve 74, so that compressed air is tapped from the main air pipe L into the transmission chamber 75. The stem 57, in its upward movement, comes to bear against the valve-body of the valve 66 and thereby cuts off the hitherto existing communication from the tank F via the pipe 32, the chamber 64 and the bore 56 to the exterior atmosphere. In the further upward movement of the stem 57, the latter lifts the valve-body of the valve 66 from its seat and thereby places the auxiliary air reservoir H in communication with the tank F through the open valve 43, the pipe 67, the chamber 64 and the pipe 32. As this inflow of compressed air takes place essentially unhindered, the tank receives a rapid initial injection of pressure air which also acts on the chamber 54 of the relay valve device J. The left end of the rocker beam 82 consequently rises and its right end is forced down. The stem 97 now closes the bore in the valve-body 94 and places the two chambers 53 and 96 in communication with one another, so that pressure air from the auxiliary air reservoir H flows into the brake cylinder and causes the brake-blocks to be applied. Owing to the frictional resistances to the flow of air existing in the pipe 32, there occurs in the chamber 64, a back pressure or congestion which results in an undesired pressure acting on the membrane 63, undesired because this pressure occurs before a corresponding pressure can be built up in the brake cylinder. Owing to the communication of the transmission chamber 75 through the throttling passage 76 with the chamber 65, however, there arises in the said chamber 65 a transient pressure which, counteracting for a short time interval the pressure in the chamber 64, prevents premature closing of the valve 66.

In the operation of the quick service valve device B as described, that arm of the bell-crank 72 which stands at right angles to the centreline of the stem 57 has been swivelled by continual upward movement of member 62 to its inlet valve opening position and is therefore now out of contact with the valve stem 77. Thereby, the influence of the membrane 58 on the valve 74 is abolished, but this valve continues to be held open by the air escaping from the main pipe until the pressure in the transmission chamber 75 has risen to such a point that the flow ceases. The valve is now closed by its spring, so that tapping is discontinued. Such pressure air as still remains in the chambers 75, 65 and 46 now gradually adapts its pressure to atmospheric through the throttling passage 48, so that the membrane 63 of the triple valve E remains under the pressure in chamber 64 only.

The connection between the auxiliary air container H and the chamber 64, which was established by the difference in pressure in the chambers 59 and 61 is maintained by the transient pressure impact in the chamber 65 in such manner that the pressure in the chamber 64 and in the chamber 54 of the relay valve device J is increased to a value greater than that which would have prevailed without the pressure in the chamber 65. The amount of this excess in pressure in the chambers 54 and 64 depends upon the load of the car, as will be described in detail hereinafter. While the pressure impact in the chamber 65 diminishes, the increased pressure in the chamber 64 causes the stem 57 to be pressed downwardly to such an extent that a connection of the chamber 64 with atmospheric air is established through the opening 56, so that compressed air in the chambers 64 and 54 can escape. As a consequence, the triple valve has moved to that operating condition in which it is under the general influence of the pressures in the chamber 59, the chamber 61 communicating with the constant pressure air tank H, and the chamber 64 communicating with the tank F. The pressure in chambers 54 and 64 rises until it is sufficient to press the stem 57 downwardly. The stem 57 then moves into its lap position in which the valve body of the valve 66 is pressed against its seat, whereby there is no connection between the opening 56 and the chamber 64. The body 71 moves downwardly along with the stem 57 to a position in which the vertical arm of the lever 72 which cooperates with the valve stem 77, is swung out of its position of rest shown in the drawing. Due to the closing of the valve 66 pressure in the chamber 54 can not increase any further. Since the connection between the chambers 53 and 96, which was produced by the valve body 94, is still open, compressed air continues to be supplied to the chamber 53 until pressure therein is increased to such an extent that the diaphragm 44 is pressed upwardly. The valve body 94 follows the stem 97 due to the action of its spring, until the connection between the chambers 53 and 96 is interrupted. From that time on the pressure in the brake cylinder Z remains unchanged, until the pressure in the main conduit L drops still further or increases again.

The effect of the variable throttling passage 48 is that the decline of the pressure in the chambers 65 of the triple valve E and 46 of the valve device M takes place at a speed which varies according to the loading of the vehicle. As will be seen from the figure, the throttling passage 48 is most widely open when the bar 86 is furthest to the right; that is to say, the pressures in chambers 64 and 45 decline rapidly. Conversely, the throttling passage 48 is only slightly open when the vehicle is empty, so that in this case the triple valve E and the minimum-pressure valve M remain longer under the influence of the counter-pressure in the chambers 65 and 46. Consequently, at the beginning of the charging of the expansion tank F, i. e., with the valve 43 open, this tank receives more pressure air per unit of time, than when the vehicles are loaded. In a pressure controller of the type shown in Fig. 1 there is substantially a proportional rate between the pressures in the chambers 53 and 54 at the beginning of the charging of the chamber 54 and when the rod 86 is firmly set. Then the rate of pressure increase in the chamber 53 is dependent from the position of the rod 86 in such manner that the greater the diminution of the rate of increase of pressure the further is the rod 86 shifted in the direction opposite to that of the illustrated arrow. When the chamber 54 is charged with the same speed, different positions of the rod 86 will correspond to a slower pressure increase in the chamber 53 in the case of a vehicle having no load, while a quicker pressure increase will take place when the vehicle is loaded. Since in accordance with the present invention the rate of the first pressure increase in the brake cylinder should be the same for all loads of the vehicle, the chamber 54 is supercharged for a short time period due to the effect of pressure in the chamber 64 and the variable throttling bore 48, to an extent which is that much greater, the smaller is the load of the vehicle. This arrangement eliminates the effect of the pressure charger during the first pressure increase in the brake cylinder.

Since the transient overcharging pressure in the chamber 54 is transmitted to the diaphragm 50 of the minimum pressure valve device M, the valve device M would be closed prematurely if such closing were not prevented by the transient pressure impact prevailing in the chamber 46. As was described already, the excessive pressure in the chamber 64 drops off simultaneously with the pressure impact in the chamber 65. Consequently, the pressure in the chamber 45 also cannot be effective; as soon as the pressure impact in the chamber 46 has dropped off, the valve device M will operate in the usual manner, namely, by switching in the throttling bore 52 at a predetermined pressure in the chamber 54, which is set only by the strength of the spring 51. Due to the above-mentioned linear relationship between pressures in the chambers 53 and 54, a pressure is produced in the brake cylinder at the time of actuation of the valve device M which is the greater, the greater is the load of the vehicle. It is thus apparent that the effect of the transient over-charging pressure in chambers 65 will vary according to the vehicle load. These results are graphically indicated in Figures 2 and 3. Figure 3 is a diagram showing the brake shoe pressure $p$ as a function of the time $t$ from the beginning of a braking for the loads 0, ½ and 1. Figure 2 shows that after a time period $t_0$, which is necessary for the application of the brake shoes, the brake shoe pressure increases steeply. This first pressure increase which, as above stated, has the same rate for all loads of the vehicle, produces at the brake shoes a minimum pressure $p_0$ which is characterized by a bend in each of the three curves in Figure 2, and which becomes greater with an increase in the load. Figure 3 is a curve showing minimum pressure $p_0$ depending upon the load. As shown in Figure 2, the brake shoe pressure $p$ increases considerably more slowly after reaching the value $p_0$. The point $p_0$ of each of the three curves of Figure 2 thus represents the actuation of the minimum pressure valve device M.

It may under certain circumstances be found expedient not to lead off through the throttling passage 48 the entire volume of air tapped from the main air pipe, but, for instance, to provide the transmission chamber 75 with a bore communicating with the exterior atmosphere.

What I claim is:

1. In a fluid pressure brake for vehicles, having a main air pipe, an auxiliary air reservoir and a brake cylinder, a relay valve device comprising a pressure chamber connected with said brake cylinder, another chamber connected with said auxiliary air reservoir, a valve interposed between said chambers, a third chamber, actuating means movable by pressure in said third chamber, other actuating means for said valve, a member interconnecting the two actuating means, a boss engaging said member and movable according to the vehicle load along said member, whereby pressure in said third chamber causes said member to swing about said boss in one direction while pressure in the first-mentioned chamber causes said member to swing about said boss in the opposite direction, the ratio of pressure in the first-mentioned chamber to pressure in the third chamber being varied by movement of said boss along said member, a variable width throttling passage connected with the atmosphere, a member connected with said boss and varying the width of said throttling passage, a relay control valve comprising a control chamber connected with said throttling passage, a constant pressure chamber, a second control chamber connected with said main air pipe, a membrane between the two last-mentioned chambers, a further chamber connected with said third chamber, a chamber connected with said auxiliary air reservoir, and a valve device connected with said membrane for interconnecting the two last-mentioned chambers, whereby the relay control valve is actuated; and a quick service valve device connected with the first-mentioned and second-mentioned control chambers and actuated by said membrane, whereby said quick service valve device is actuated when pressure drops in the main air pipe to supply fluid under pressure to said first chamber to oppose pressure in said further chamber for a period of time depending upon the width to which the throttling passage is open.

2. A fluid pressure brake for vehicles, in accordance with claim 1, wherein the member interconnecting the two actuating means consists of a rocker beam, said membrane being actuated by opposed pressures in said main air pipe and in said constant pressure chamber, the brake further comprising a membrane located between the first-mentioned control chamber and said further chamber and connected with said valve device, the last-mentioned membrane being actuated by opposed pressures in said third chamber and the first-mentioned control chamber and acting to open the valve device by pressure in the first-mentioned control chamber; said quick service valve device comprising a valve for interconnecting the first-mentioned and second-mentioned control chambers, biasing means normally holding the last-mentioned valve closed, and a device normally mechanically interconnecting said membrane and the last-mentioned valve and opening the last-mentioned valve when the membrane is shifted in the opening direction, whereby in the event of a drop in pressure in the main air pipe the pressure in the first-mentioned control chamber tends to maintain open the valve device which was opened by the first-mentioned membrane to an extent which is inversely proportional to the operative width of the throttling passage.

3. A fluid pressure brake for vehicles, in accordance with claim 1, wherein said quick service valve device comprises a valve for interconnecting the first-mentioned and second-mentioned control chambers, biasing means normally holding the last-mentioned valve closed, a device normally mechanically interconnecting said membrane and the last-mentioned valve and opening the last-mentioned valve when the membrane is shifted in the opening direction, and a guide for said device, said guide interrupting the connection of said membrane with the last-mentioned valve after the last-mentioned valve is opened, whereupon said biasing means close the last-mentioned valve.

4. A fluid pressure brake for vehicles, in accordance with claim 3, wherein the member connected with said boss and varying the width of the throttling passage consists of a bar integral with said boss and having an end projecting into said throttling passage to vary the width thereof, the brake further comprising means adjustably depending upon the load of the vehicle and in driving connection with said bar to vary said ratio when the load of the vehicle is increased and simultaneously increase the width of said throttling passage, whereby the duration of pressure operative in the first-mentioned control chamber diminishes with the increase of the load of the vehicle.

5. In a fluid pressure brake for vehicles, having a main air pipe, an auxiliary air reservoir and a brake cylinder; a relay valve device comprising a pressure chamber connected with said brake cylinder, another chamber connected with said auxiliary air reservoir, a valve interposed between said chambers, a third chamber, actuating means operable by the difference in pressure between the first-mentioned chamber and the third chamber, a variable width throttling passage connected with the atmosphere, means engaging said actuating means and varying the width of said throttling passage, a quick service valve device, a relay control valve comprising a control chamber connected with said throttling passage, whereby the throttling passage generates during the venting of fluid pressure from the air pipe by said quick service valve device a transient controlling pressure varying inversely with the load of the vehicle, a constant pressure chamber, a second control chamber connected with said main air pipe, a further chamber connected with said third chamber, a valve-containing chamber, and a valve device for interconnecting the two last-mentioned chambers, a membrane located between the first-mentioned control chamber and said further chamber and connected with said valve device, said quick service valve device being connected with said control chambers, means actuating said valve device and said quick service valve device and responsive to difference in pressure between said constant pressure chamber and said second control chamber, a pipe connecting said valve-containing chamber with said auxiliary air reservoir, a throttling passage in said pipe, and another valve device having two normally interconnected chambers connected with said pipe and short-circuiting the last-mentioned throttling passage, a chamber connected with the first-mentioned control chamber, a chamber connected with said auxiliary air reservoir, a membrane between the last-mentioned chambers and a valve connected with the last-mentioned membrane for interrupting the connection between said normally interconnected chambers, whereby upon reduction in pressure in the main air pipe the first and second-mentioned membranes are pressure-influenced to delay the closures of the valve device of the relay control valve and the valve of the other valve device during a time period the duration of which varies inversely with the load of the vehicle.

References Cited in the file of this patent
UNITED STATES PATENTS

| | | |
|---|---|---|
| 1,108,948 | Turner | Sept. 1, 1914 |
| 2,027,469 | Campbell | Jan. 14, 1936 |
| 2,032,144 | Nelson | Feb. 25, 1936 |
| 2,034,276 | White | Mar. 17, 1936 |
| 2,066,404 | Kasantzeff | Jan. 5, 1937 |
| 2,133,275 | Andres | Oct. 18, 1938 |
| 2,173,928 | Borde et al. | Sept. 26, 1939 |
| 2,513,486 | Herman | July 4, 1950 |
| 2,534,622 | Pickert | Dec. 19, 1950 |
| 2,543,099 | Eaton | Feb. 27, 1951 |